T. MAYES.
Overflow Alarms.

No. 144,687. Patented Nov. 18, 1873.

Witnesses.
E. Wolff
E. Sedgwick

Inventor,
T. Mayes
Per
[signature]
Attorneys.

UNITED STATES PATENT OFFICE.

THOMAS MAYES, OF ALBANY, NEW YORK.

IMPROVEMENT IN OVERFLOW-ALARMS.

Specification forming part of Letters Patent No. 144,687, dated November 18, 1873; application filed July 5, 1873.

*To all whom it may concern:*

Be it known that I, THOMAS MAYES, of the city and county of Albany and State of New York, have invented a new and Improved Overflow-Alarm, of which the following is a specification:

The invention will first be fully described, and then pointed out in the claim.

Figure 1:
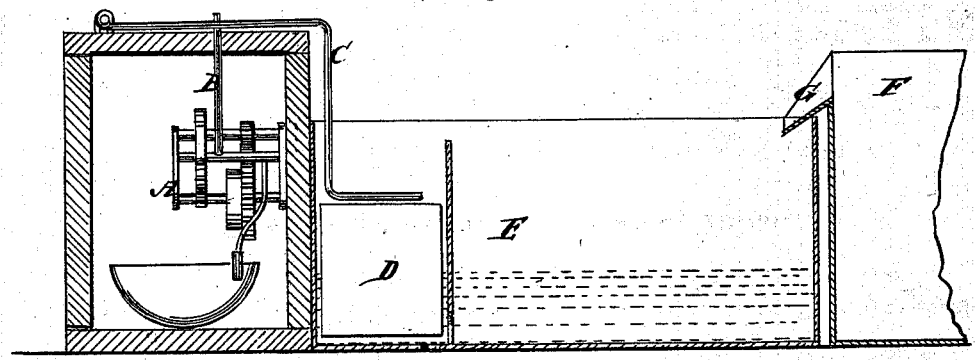
Figure 2:
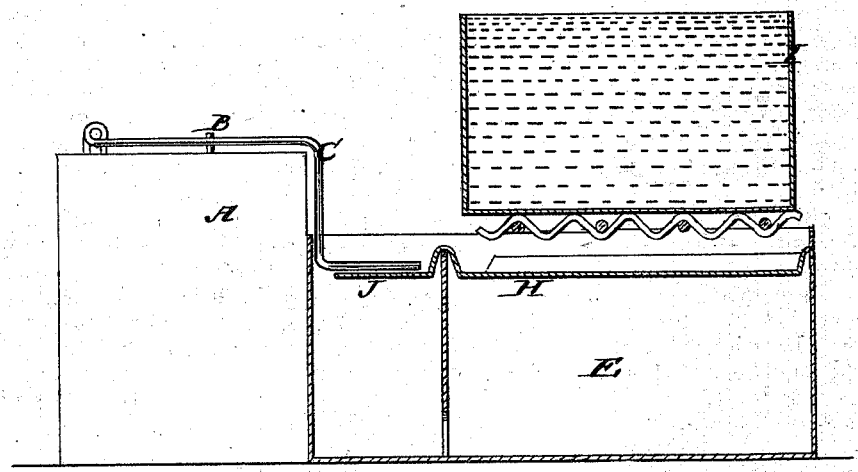

Figure 1 is a sectional elevation of the alarm mechanism, float, pan, and secondary pan, showing the arrangement of the apparatus, in connection with a refrigerator, to prevent the overflow of the drip. Fig. 2 is a side elevation of the case of the alarm mechanism and a section of the drip-pan, tilting-pan, and a molasses pan, to be filled.

A represents the alarm mechanism, which may be of any suitable kind. B represents the lever for holding it when it is not required to be sounded. C is a catch for tripping said lever. D is the float in the drip-pan E to disengage said lever when the fluid rises in the pan nearly to the point of overflowing. The pan E is to be set under the refrigerator or other thing from which the liquid which is to be caught drips, but as this arrangement involves the resetting of the alarm every time the pan is emptied, which is not necessary so long as the business is kept in remembrance, I employ another pan, F, which can be emptied without disturbing the alarm to receive the drip first and fix it so as to discharge by a spout, G, into pan E, in case it is forgotten. Instead of filling the pan E to release the alarm by a float, I may have a tilting-pan, H, to raise it by receiving the drip from pan F, or any other pan, I, upon it, the said tilting-pan being weighted at J, so that the drip falling on it at the other side of the fulcrum will raise the trip-latch. Instead of raising the float D in the pan E, I may have it in a barrel and connect it with the trip-latch by wires, in any suitable way, for causing the latter to release the alarm.

Having thus described my invention, I claim as new and desire to secure by Letters Patent—

The tilting-pan H, fulcrumed and projecting beneath a drip-spout, combined with the catch C, lever B, and alarm A, as and for the purpose described.

THOS. MAYES.

Witnesses:
JAMES GAZELEY,
CHAS. F. SCHIFFER.